US012730611B2

(12) United States Patent
Khan

(10) Patent No.: US 12,730,611 B2
(45) Date of Patent: Sep. 8, 2026

(54) POLICY CONTROLLED FUNCTION GENERATORS

(71) Applicant: INTERNATIONAL BUSINESS MACHINES CORPORATION, Armonk, NY (US)

(72) Inventor: Muhammad Usman Karim Khan, Sindelfingen (DE)

(73) Assignee: International Business Machines Corporation, Armonk, NY (US)

(*) Notice: Subject to any disclaimer, the term of this patent is extended or adjusted under 35 U.S.C. 154(b) by 234 days.

(21) Appl. No.: 18/629,356

(22) Filed: Apr. 8, 2024

(65) Prior Publication Data

US 2025/0315216 A1 Oct. 9, 2025

(51) Int. Cl.
*G06F 8/30* (2018.01)

(52) U.S. Cl.
CPC .................................... *G06F 8/30* (2013.01)

(58) Field of Classification Search
CPC .................................. G06F 8/30; G06F 11/36
See application file for complete search history.

(56) References Cited

U.S. PATENT DOCUMENTS 10,157,045 B2 12/2018 Venkataramani
10,235,142 B1 3/2019 Chaffin
10,949,182 B2 3/2021 Venkataramani
11,716,264 B2 8/2023 Nainar
12,253,932 B1 * 3/2025 Schumacher ....... G06F 11/3438
2015/0106797 A1 4/2015 Balasubramanian
2017/0277518 A1 * 9/2017 Krishnan .................. G06F 8/35
2020/0234346 A1 * 7/2020 Venkateswaran ......... G06F 8/77

FOREIGN PATENT DOCUMENTS

CN 106502896 A 3/2017
WO 2023078116 A1 5/2023

OTHER PUBLICATIONS

Disclosed Anonymously, "Method and System for Usage Aware Ad-Hoc Application Management Aligned with Organizational Policies," An IP.com Prior Art Database Technical Disclosure, IP.com No. IPCOM000264299D, Dec. 1, 2020, 4 pages.
Shojaee et al., "Execution-based Code Generation using Deep Reinforcement Learning," arXiv:2301.13816v4, Jul. 19, 2023, 26 pages.
Tsiounis et al. "Goal and Policy Based Code Generation and Deployment of Smart Contracts," 2022IEEEInternational Conference on Software Analysis, Evoliation and Reengineering (SANER) 2022, pp. 1227-1230.
Zaremba et al., "OpenAl Codex," https://openai.com/blog/openai-codex, printed from the internet Feb. 26, 2024, 10 pages.

* cited by examiner

*Primary Examiner* — Duy Khuong T Nguyen
(74) *Attorney, Agent, or Firm* — Stosch Sabo

(57) ABSTRACT

Described are techniques for automated software function code generation. The techniques include generating a list of algorithms configurable with a requested software code function provided by a client device, where the list of algorithms is based on evaluating a plurality of software policies. The techniques further include generating the requested code function based on a selected algorithm of the list of algorithms and using a repository of reusable code samples in a plurality of programming languages. The techniques further include transmitting the requested code function to the client device.

20 Claims, 8 Drawing Sheets

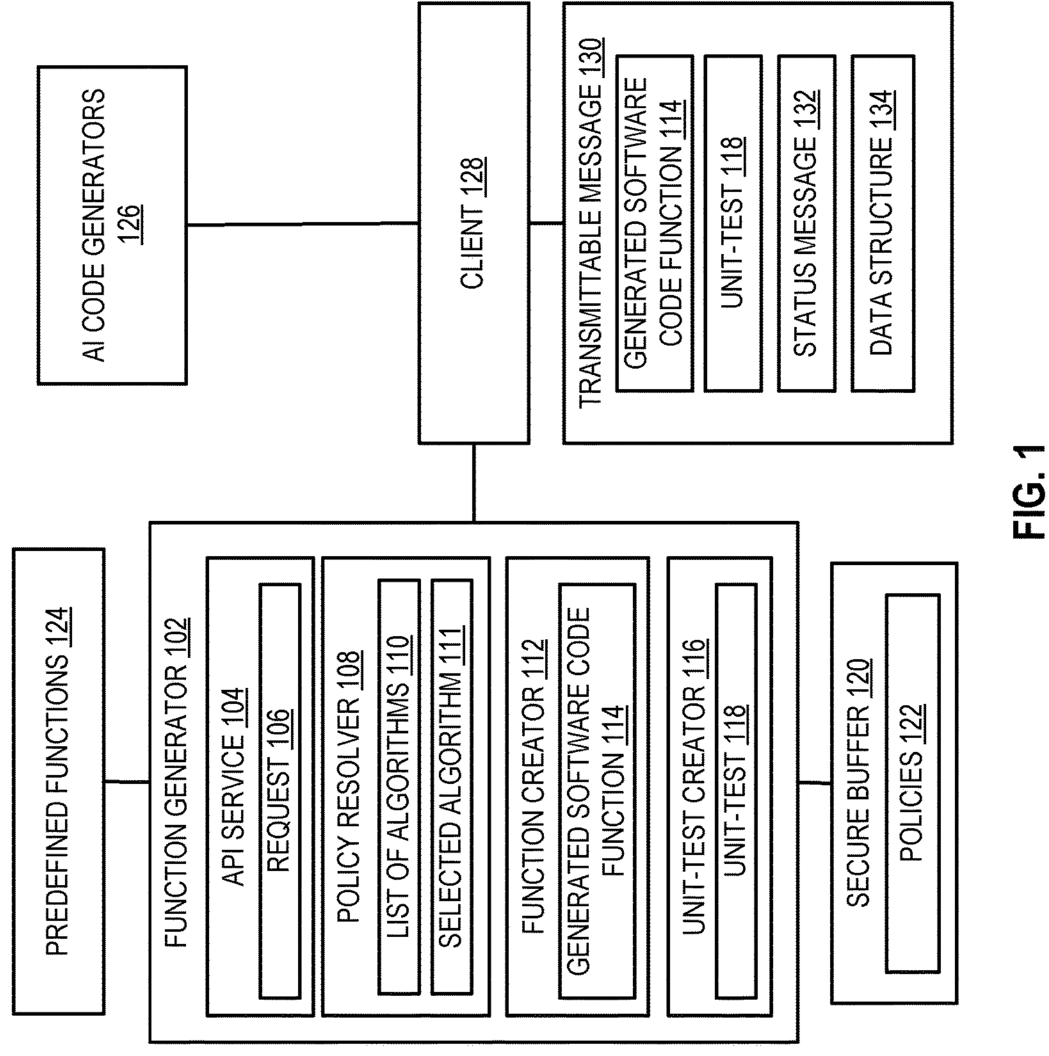
FIG. 1
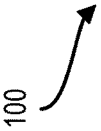

200

```
{
    “name”: “organization-policy”,
    “cryptography”: {
        “asymmetric-ciphers”: {
            “allowed”: “CRYSTALS-KYBER, CRYSTALS-Dilithium, RSA-4096”,
            “disallowed”: “Diffie-Hellman, RSA-1024, RSA-2048”
        },
        “symmetric-ciphers”: {
            “allowed”: “AES256-GCM, AES512-GCM”,
            “disallowed”: “AES128-GCM, AES256-CBC, AES512-CBC”
        },
        …
    },
    …
}
```

```
{
    "name": "machine-policy",
    "cryptography": {
        "asymmetric-ciphers": {
            "allowed": "Diffie-Hellman, CRYSTALS-Dilithium, RSA-4096, secp384r1",
            "disallowed": "CRYSTALS-KYBER, secp256r1"
        },
        "symmetric-ciphers": {
            "allowed": "AES128-GCM, AES256-GCM, AES512-GCM, AES256-CBC,
            AES512-CBC",
            "disallowed": ""
        },
        ...
    },
    "lossless-compression": {
        "allowed": "Deflate-level-1, Snappy, LZ4, pigz",
        "disallowed": "LZMA, LZW"
        "process": {
            "total-threads": "8",
            "total-memory": "32g"
        },
        "power": {
            "thermal-design-power": "20W"
        },
        ...
    },
    ...
}
```

```
allow_algorithm_list = {
        {org_policy_asymmetric_allowed ∩ machine_policy_asymmetric_allowed} ∪
        {org_policy_asymmetric_allowed} ∪
        {machine_policy_asymmetric_allowed - org_policy_asymmetric_disallowed}
    }
disallow_algorithm_list = {org_policy_asymmetric_disallowed ∪ machine_policy_asymmetric_disallowed}

org_policy_asymmetric_allowed = {CRYSTALS-KYBER, CRYSTALS-Dilithium, RSA-4096}
machine_policy_asymmetric_allowed = {Diffie-Hellman, CRYSTALS-Dilithium, RSA-4096, secp384r1}
org_policy_asymmetric_disallowed = {Diffie-Hellman, RSA-1024, RSA-2048}
org_policy_asymmetric_allowed ∩ machine_policy_asymmetric_allowed = {CRYSTALS-Dilithium, RSA-4096}
machine_policy_asymmetric_allowed - org_policy_asymmetric_disallowed = {secp384r1}

allow_algorithm_list = {CRYSTALS-Dilithium, RSA-4096, CRYSTALS-KYBER, secp384r1}

disallow_algorithm_list = {Diffie-Hellman, RSA-1024, RSA-2048, CRYSTALS-KYBER, secp256r1}
```

FIG. 4

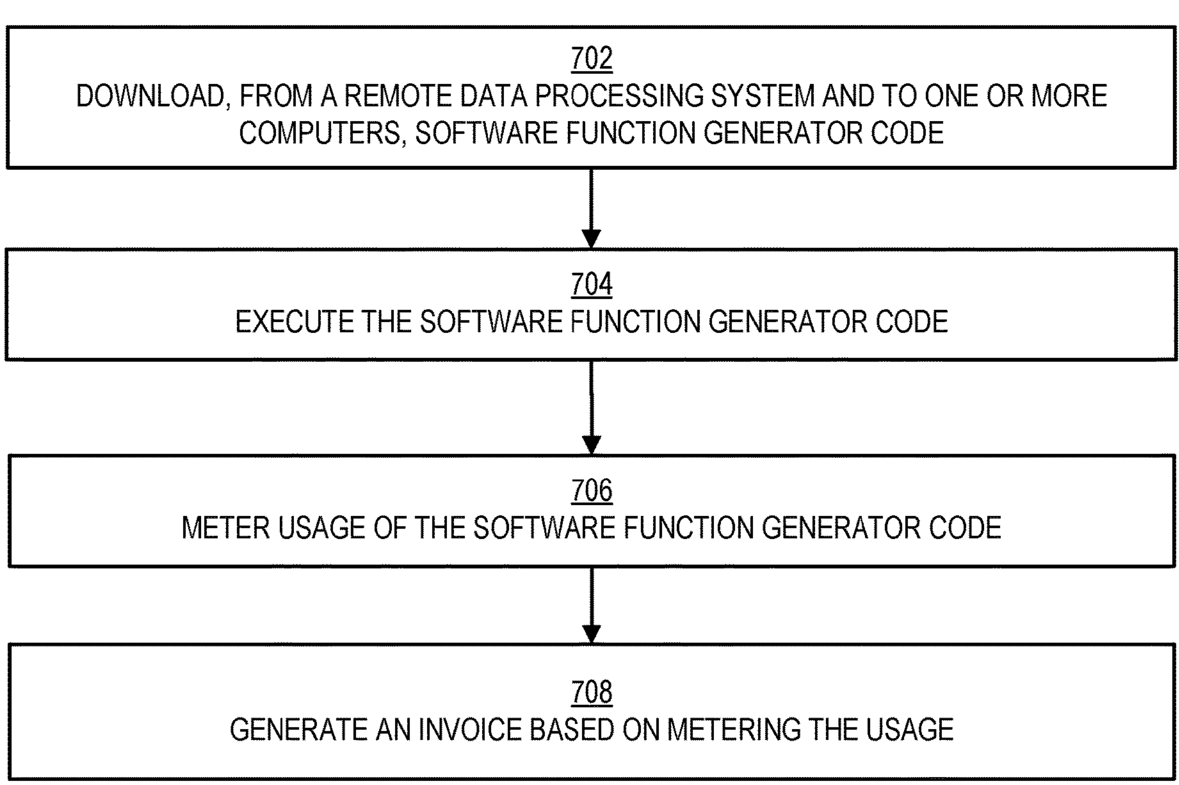
FIG. 7

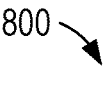

COMPUTER 801

PROCESSOR SET 810

PROCESSING CIRCUITRY 820

CACHE 821

COMMUNICATION FABRIC 811

VOLATILE MEMORY 812

PERSISTENT STORAGE 813

OPERATING SYSTEM 822

SOFTWARE FUNCTION GENERATOR CODE 846

PERIPHERAL DEVICE SET 814

UI DEVICE SET 823

STORAGE 824

IoT SENSOR SET 825

NETWORK MODULE 815

END USER DEVICE 803

REMOTE SERVER 804

REMOTE DATABASE 830

WAN 802

PRIVATE CLOUD 806

GATEWAY 840

PUBLIC CLOUD 805

CLOUD ORCHESTRATION MODULE 841

HOST PHYSICAL MACHINE SET 842

VIRTUAL MACHINE SET 843

CONTAINER SET 844

FIG. 8

POLICY CONTROLLED FUNCTION GENERATORS

BACKGROUND

The present disclosure relates to software development, and, more specifically, to automated software development.

Software development is the methodology used to conceive, characterize, design, program, document, test, and/or troubleshoot new or existing software (e.g., applications, software modules, etc.). At its core, software development involves creating computer-executable source code that is performant and robust.

SUMMARY

In some aspects, the techniques described herein relate to a computer-implemented method comprising generating a list of algorithms configurable with a requested software code function provided by a client device, where the list of algorithms is based on evaluating a plurality of software policies. The computer-implemented method further comprises generating the requested code function based on a selected algorithm of the list of algorithms and using a repository of reusable code samples in a plurality of programming languages. The computer-implemented method further comprises transmitting the requested code function to the client device.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 1 illustrates a block diagram of an example system for automated and policy-compliant software code function generation, in accordance with some embodiments of the present disclosure.

FIG. 2 illustrates example organization policy pseudo-code, in accordance with some embodiments of the present disclosure.

FIG. 3 illustrates example machine policy pseudo-code, in accordance with some embodiments of the present disclosure.

FIG. 4 illustrates example policy resolver pseudo-code, in accordance with some embodiments of the present disclosure.

FIG. 7 illustrates a flowchart of an example method for downloading, deploying, metering usage, and invoicing software function generator code, in accordance with some embodiments of the present disclosure.

FIG. 8 illustrates a block diagram of an example computing environment, in accordance with some embodiments of the present disclosure.

Figure 5:
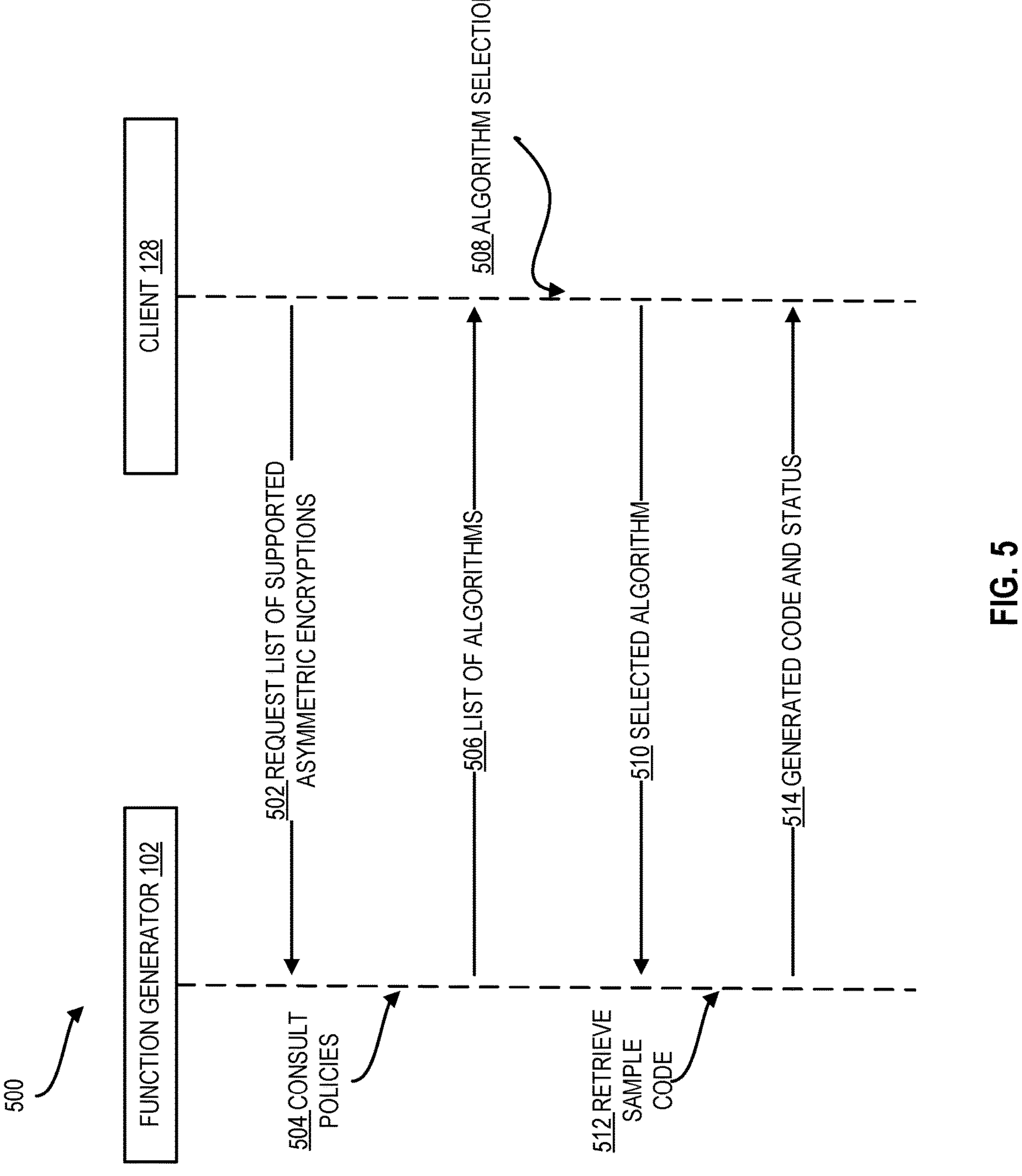
FIG. 5 illustrates a block diagram of example interactions between a function generator and a client, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward software development, and, more specifically, to automated software development. While not limited to such applications, embodiments of the present disclosure may be better understood in light of the aforementioned context.

Embodiments of the present disclosure are directed toward techniques for automatically generating common code (e.g., encryption/decryption schemes, compression schemes, etc.) using policies defined by a developer, enterprise, an administrator (admin) of the computing environment, and/or others. At a high level, aspects of the present disclosure overcome the technical challenge of ensuring that functions used in a program are performant, compliant, and adhere to appropriate policies for a given computational environment.

A first challenge addressed by aspects of the present disclosure relates to the recognition that when a developer writes code for an application, the developer may be unaware of the best options for a given system. For example, when developing code for an application that utilizes encryption/decryption functions, the developer might use (i) a most common encryption/decryption method and/or tool; (ii) an encryption/decryption method available in an accessible software library; (iii) an encryption/decryption method utilized by the developer's organization or enterprise; or (iv) an encryption/decryption method copy-pasted from a code database.

As a result, the developer may be unaware of the capabilities provided by the platform, thereby resulting in sub-optimal code. As one example, different computational systems provide hardware accelerators for different Elliptic Curve Cryptography (ECC) curves, thereby influencing the types of ECC curves that should be used in encryption/decryption functions of application code. As another example, different computational systems provide support for different data-at-rest encryption, thereby influencing the type of data-at-rest encryption used in various application code. As yet another example, some computational systems include dedicated compression accelerators, whereas others do not, thereby influencing how compression functions are used in various application code.

A second challenge addressed by aspects of the present disclosure relates to the recognition that migration can cause sub-optimal code function for the corresponding application code. For example, even if an optimal code function is used and compiled into a binary, it can be difficult to modify and/or maintain the code function to make it performant on each system that the binary is executed. In some instances, an application can be migrated to a different execution environment or a newer version of a previous execution environment, and the decisions made for certain code functions (e.g., encryption/decryption) are no longer relevant or preferred in the migrated execution environment.

A third challenge addressed by aspects of the present disclosure relates to the recognition that code functions may be non-compliant. For example, in some situations, a developer may need to select a type of code function that satisfies a designated compliance policy. An example compliance policy is that an application running in a designated execution environment must utilize quantum-safe encryption. However, in some instances, a developer can be unaware of the compliance policies required for various code functions.

A fourth challenge addressed by aspects of the present disclosure relates to the recognition that Artificial Intelligence (AI) code generators can generate sub-optimal code. For example, AI source code generators may ignore platform-specific or compliance-specific needs for specific applications. Furthermore, the code functions generated by AI source code generators can be overly generalized (to maintain cross-platform functionality) which can thereby reduce performance of the generated code (insofar as the generated code functions are not tailored to a specific platform). Additionally, AI source code generators can be ill-suited to migrating source code between types of execution environments and/or versions of execution environments.

A fifth challenge addressed by aspects of the present disclosure relates to the lack of auditing and logging for source code functions. For example, developers and/or AI source code generators may not implement any auditing or logging in the generated functions. This can be a result of mere inexperience or intentional overhead reduction in the software development lifecycle. As a result, the lack of auditing and/or logging can result in high development costs and can lead to errors if development teams fail to comply with organizational policies.

A sixth challenge addressed by aspects of the present disclosure relates to large scale source code usage. Using source code samples on a large scale is challenging. A large organization with hundreds or thousands of developers may need an automated way of implementing the security, compliance, and performance policies defined by the large organization.

Aspects of the present disclosure are directed toward overcoming the aforementioned challenges, among others, as will now be described with reference to the figures. FIG. 1 illustrates a block diagram of an example system 100 for automated and policy-compliant software code function generation, in accordance with some embodiments of the present disclosure. The system 100 includes a function generator 102, predefined functions 124, secure buffer 120, AI code generators 126, client 128, and transmittable message 130 communicatively coupled to one another (directly or indirectly) via one or more continuous or intermittent networks (not shown).

The function generator 102, AI code generators 126, and client 128 can comprise physical and/or virtual computational resources such as processors, storage, network, and/or other resources. Predefined functions 124, secure buffer 120, and transmittable message 130 can be computer-readable and/or computer-executable content that is saved in physical or virtual storage resources and accessible to the function generator 102, AI code generators 126, and/or client 128 via one or more continuous or intermittent network connections (not shown).

Although the function generator 102, secure buffer 120, predefined functions 125, AI cod generators 126, client 128, and transmittable message 130 are shown separately, in various embodiments the aforementioned components (including more or fewer components than the components shown) can be integrated together in different configurations than the configurations shown. For example, aspects of the present disclosure can reside within client 128, where the client 128 downloads computer-executable program code to run various elements of FIG. 1 within the client 128.

The function generator 102 can receive, retrieve, or otherwise access predefined functions 124. Predefined functions 124 can include repository of reusable software code functions that can be used by the function generator 102. Predefined functions 124 can include, for example, Java® samples, C samples, C++ samples, Python® samples, Very High Speed Integrated Circuit (VHSIC) Hardware Description Language (VHDL) samples, Verilog® samples, and/or other samples from other coding languages now known or later developed. The predefined functions 124 can be stored in a library or source-code repository, for example. The samples included in predefined functions 124 can be stored as plain text files, as one or more extensible Markup Language (XML) files, and/or in another data structure, now known or later developed.

In some embodiments, the predefined functions 124 are automatically created using AI code generators 126. AI code generators 126 can be one or more machine learning models, AI models, Large Language Models (LMMs), and/or other types of models that are capable of automatically generating source code. Additionally, if AI code generators 126 are used for creating the source code of executables (e.g., the predefined functions 124), then the AI code generators 126 can use the function generator 102 to additionally create the generated software code function 114 for the executable, while abiding by the policies 122.

The function generator 102 can receive, retrieve, or otherwise access secure buffer 120. Secure buffer 120 stores policies 122 such as, but not limited to, an organization policy, a machine (e.g., execution environment) policy, a developer policy, an administrator of an execution environment policy, and the like. The policies 122 can be generated based on compliance requirements, developer experience/preference, customer requirements, available hardware (e.g., accelerators), and the like. The policies 122 in secure buffer 120 can collectively define how a given software code function can be executed. For example, policies 122 in secure buffer 120 can define the preferred and/or required features for software code functions such as features related to security, performance, Service Level Agreement (SLA), and/or Quality of Service (QOS) of an application, power consumed (or performance-per-watt) of the machine, reliability of the software code function, soft-error-resiliency of the software code function, and the like.

The secure buffer 120 can be local or remote. The secure buffer 120 can include sub-spaces respectively allocated to the parties involved in creating and running the executable. For example, a sub-space can exist for an organization to insert its policy, another sub-space for the machine that will run the executable, another sub-space for the developer of the application, another sub-space for the administrator of the environment that will run the application, another sub-space for the end-user of the executable, and so on. In some embodiments, each sub-space is only accessible by the respective entities that are registered with the function generator 102. Each registered entity can write and update the policies regarding the software code function inside the appropriate sub-space (e.g., using a key-pair). As an example, an organization can encrypt the policy it wants the executable to use with the public key provided by the function generator 102 and sign it. Afterwards, the organization can send the encrypted and signed policy to the function generator 102 which can decrypt the policy and use it for creation of compliant software code functions. More specifically, the function generator 102 reads the policies in the secure buffer 120 and creates the functions depending upon the policies.

Example organization policy pseudo-code 200 is shown in FIG. 2. As shown in FIG. 2, the organization policy can characterize parameters for functions that use asymmetric and symmetric cryptography. For example, the organization policy example of FIG. 2 disallows using "Diffe-Hellman" as a key-exchange protocol and allows alternatives such as the quantum-safe "CRYSTALS-KYBER." Similarly, for signatures, the example organization policy of FIG. 2 allows either the quantum-safe "CRYSTALS-Dilithium" or "RSA-4096."

Example machine policy pseudo-code 300 is shown in FIG. 3. As shown in FIG. 3, the example machine policy pseudo-code 300 allows for more asymmetric and symmetric ciphers (e.g., if the machine has hardware accelerators for those ciphers) relative to the example organization policy pseudo-code 200 described with reference to FIG. 2. Additionally, the example machine policy pseudo-code 300 defines which compression algorithms can be used. The example machine policy pseudo-code 300 additionally defines the total threads and total memory to be used by the functions (e.g., to limit the amount of processor threads and memory consumed by the functions that will be created by the function generator 102). This can also be used to limit the power consumed by the software code functions when deployed on the machine.

The function generator 102 comprises API service 104, policy resolver 108, function creator 112, and unit-test creator 116. The function generator 102 can receive a request 106 via the API service 104 and from the client 128. The request 106 can be to create a requested software code function. In response, the function generator 102 scans the policies 122 in the secure buffer 120. Based on the policies 122, and the precedence between policies, the function generator 102 selects the right algorithm to generate the function.

Policies 122 can be associated with a precedence number. For example, policies 122 can be ranked in order of precedence as (i) organization policies, (ii) environment administrator policies, (iii) developer policies, (iv) machine policies, (v) customer policies, and so on. The aforementioned example is but one example and numerous alternatives will be apparent to those skilled in the art.

The policy resolver 108 can integrate multiple policy precedencies to accurately assimilate numerous policies. Example policy resolver pseudo-code 400 is shown in FIG. 4. The example policy resolver pseudo-code 400 takes the organization policy pseudo-code 200 of FIG. 2 and the machine policy pseudo-code 300 of FIG. 3 as input. In this example, the organization policy pseudo-code 200 can have a relatively higher precedence than the machine policy pseudo-code 300.

The example policy resolver pseudo-code 400 can generate an allow_algorithm_list and a disallow_algorithm_list identifying which asymmetric encryption algorithms are allowed and disallowed by the policies. The allow_algorithm_list can be the list of algorithms 110 as shown in FIG. 1. Although an analysis of two policies is shown in FIG. 4, in other embodiments, many policies can be evaluated together (either simultaneously or iteratively).

In some embodiments, the function generator 102 transmits the list of algorithms 110 to the client 128 and awaits a response from the client 128 indicating a selected algorithm 111 of the list of algorithms 110. In other embodiments, the function generator 102 elects a selected algorithm 111 from the list of algorithms 110. Determination of the selected algorithm 111 can be manual or automatic. When manual, the determination of the selected algorithm 111 can be based on user input received at the client 128. When automated, the determination of the selected algorithm 111 can be based on, for example, a first algorithm in the list of algorithms 110, a first algorithm in the list of algorithms 110 that complies with a predefined policy, or another automated methodology.

After identifying the selected algorithm 111, the function generator 102 utilizes the function creator 112 to create the generated software code function 114. The generated software code function 114 can comprise any amount of source code. For example, the generated software code function 114 can comprise a software function, an executable, an application, a library, a container image, a Kernel-based Virtual Machine (KVM) guest, and/or other software related code.

The generated software code function 114 can be generated based on the selected algorithm 111 and the predefined functions 124. For example, the function creator 112 can select one of the reusable code functions in the predefined functions 124 that complies with a type of function (from the request 106), a programming language (identified in the request 106), and the selected algorithm 111, among other possible characteristics. The function creator 112 can utilize the selected reusable code function from the predefined functions 124 as the generated software code function 114, or, in other embodiments, the function creator 112 modifies the selected reusable code function from the predefined functions 124 to create the generated software code function 114. When modified, the selected reusable code function can be altered to adjust variables, algorithms, references, and/or other features of the selected reusable code function.

The function generator 102 is further configured to utilize unit-test creator 116 to generate a unit-test 118 of the generated software code function 114. As is understood by one skilled in the art, a unit-test 118 is a block of code that verifies the accuracy of a smaller, isolated block of application code (e.g., a function or a method). The unit-test 118 can be used to determine if the generated software code function 113 of runs as expected.

The function generator 102 is further configured to generate a transmittable message 130 that can be communicated to the client 128. The transmittable message 130 includes at least the generated software code function 114. Additionally, the transmittable message 130 can further include the unit-test 118, a status message indicating whether creation of the generated software code function 114 was successful, and a data structure 134 indicating which (if any) of the policies 122 the generated software code function 114 complies with and which (if any) of the policies 122 the generated software code function 114 does not comply with.

Referring now to FIG. 5, illustrated is a process diagram 500 for implementing a function generator 102, in accordance with some embodiments of the present disclosure. Although FIG. 5 illustrates the specific example of generating an asymmetric encryption function, those skilled in the art will recognize the broad adaptability of the FIG. 5 to many other types and classes of software code functions. Initially, the client 128 sends a request for a list of supported asymmetric encryption key-pair algorithms that can be created by the function generator 102. This is illustrated at operation 502.

In operation 504, the function generator 102 receives the request initiated in operation 502. The function generator 102 checks the policies that enforce any requirement regarding the key-pair generation function. As previously discussed in the example policies, this can include an organizational policy (e.g., see FIG. 2) and a machine policy (e.g., see FIG. 3), though in other embodiments more, fewer, and/or different policies may be relevant to a key-pair generation function (or any other type or class of software code function). Continuing with the previously discussed example, the function generator can utilize a policy resolver 108 (e.g., see FIG. 4) to assimilate information from multiple policies with multiple precedencies.

In operation 506, the function generator 102 provides a list of algorithms to the client 128. In some embodiments, operation 506 provides an allow_algorithm_list as shown in reference to FIG. 4.

In operation 508, the client 128 selects an algorithm. In some embodiments, the client 128 automatically selects one of the algorithms in the list provided in operation 506. As one example, the client 128 can automatically select a top or first algorithm in the list of algorithms. In another embodiment, the client 128 can automatically select a top algorithm pertaining to a certain policy (e.g., a first algorithm that is available and included in a machine policy). In yet other embodiments, the function generator 102 automatically selects an algorithm from the list of algorithms.

In operation 510, the client 128 transmits an indication of the selected algorithm to the function generator 102. The indication can include information such as, but not limited to, (i) a type of function (e.g., encryption, compression, etc.), (ii) an algorithm to be used with the function (e.g., a type of asymmetric encryption), (iii) a programming language to be used for the function, and/or (iv) other attributes of the algorithm (e.g., power consumed, threads created, etc.).

In operation 512, the function generator 102 receives the information and samples the predefined functions to identify code that complies with the request sent in operation 510. In some embodiments, the function generator 102 modifies the retrieved sample code, whereas in other embodiments, the function generator 102 utilizes the same code as the retrieved sample code. For example, there can be separate functions for each participant in an asymmetric encryption protocol, and the function generator 102 can identify the right function from the predefined functions and provide it to the client 128. In another example, the sample code is modular with code strings that need to be replaced by the function generator 102. The function generator 102 can then create the asymmetric encryption function using the identified modules.

In operation 514, the function generator 102 transmits the generated code to the client 128. The generated code transmitted in operation 514 can include, for example, (i) the generated code for the function and the requested algorithm, (ii) a unit-test for the created function and the requested algorithm, (iii) a status denoting whether function creation is successful, and/or (iv) a data structure denoting which (if any) policies are satisfied and which (if any) policies are not satisfied by the created function.

Figure 6:
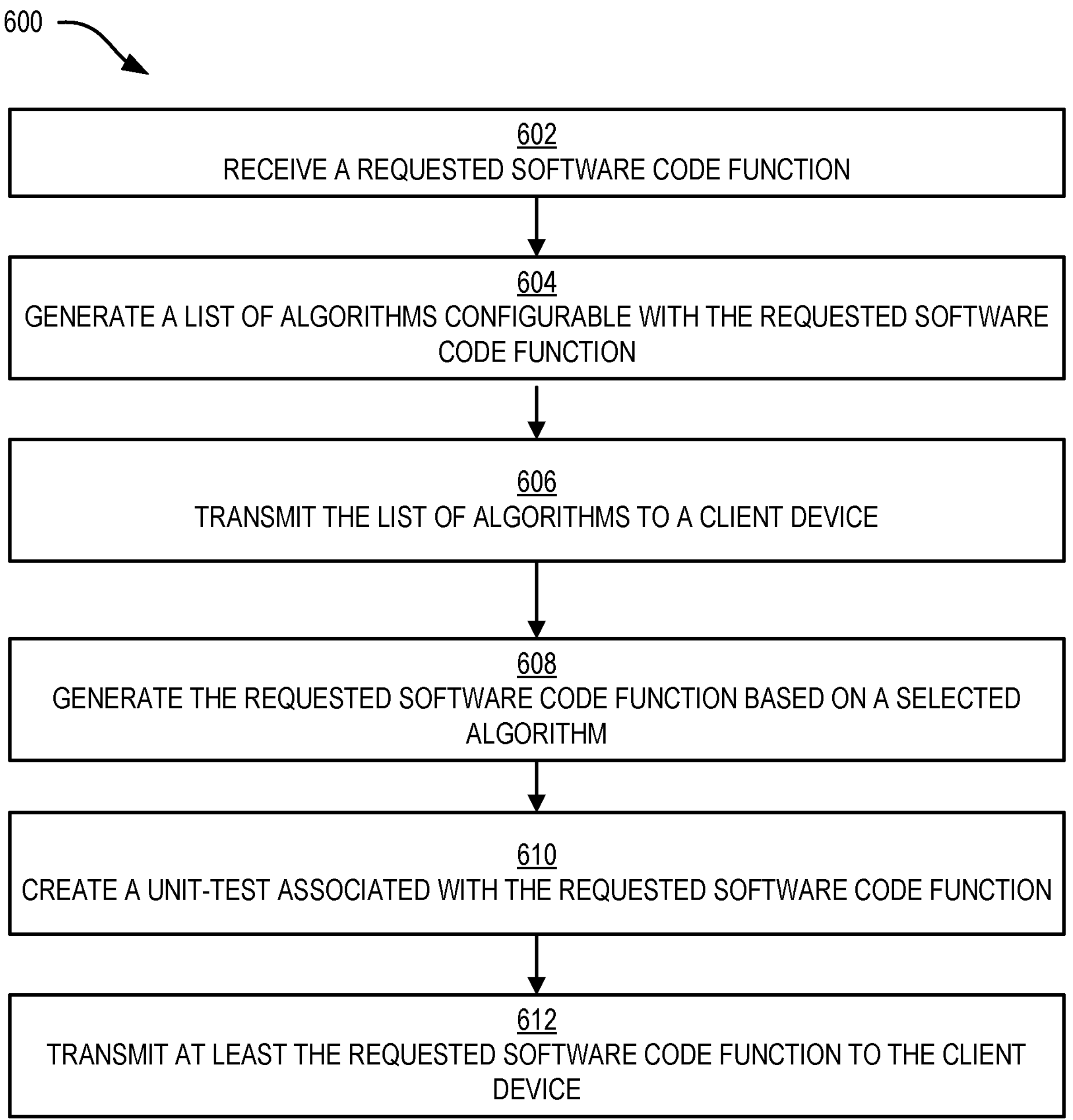
FIG. 6 illustrates a flowchart of an example method for automatically generating policy-compliant software code functions, in accordance with some embodiments of the present disclosure.

Referring now to FIG. 6, illustrated is a flowchart of an example method 600 for automated generation of software code functions, in accordance with some embodiments of the present disclosure. The method 600 can be implemented by, for example, a function generator (e.g., function generator 102) and/or other components of FIG. 1, one or more computers (e.g., computer 801 of FIG. 1), one or more processors, and/or another configuration of hardware and/or software.

Operation 602 includes receiving a requested software code function. Operation 602 can receive the requested software code function from a client device (e.g., client 128 of FIG. 1). The requested software code function can include, for example, a type of function, a class of function, a programming language of the function, policies associated with the function, and the like.

Operation 604 includes generating a list of algorithms configurable with the requested software code function. In some embodiments, operation 604 accounts for one or more policies associated with the requested software code function. In embodiments where one or more of the policies are associated with a precedence, a policy resolver can be implemented to generate the list of algorithms that comply with the one or more policies in view of any precedencies between the policies.

Operation 606 includes transmitting the list of algorithms to the client device that initiated the requested software code function. In some embodiments, operation 606 further includes receiving, from the client device, a selection of one of the algorithms in the transmitted list of algorithms. In some embodiments, the selected algorithm is selected based on manual input to an interface of the client device. In other embodiments, the selected algorithm is an automatically selected algorithm such as a first algorithm in the list of algorithms or a first algorithm that complies with a specified policy in the list of algorithms. In embodiments where the selected algorithm is selected automatically, the list of algorithms need not necessarily be sent to the client device. Rather, in such embodiments, the determination of the select algorithm can occur at the function generator.

Operation 608 includes generating the requested software code function based on the selected algorithm. Operation 608 can generate the requested software code function by querying a repository of reusable code functions in different programming languages (e.g., predefined functions 124 of FIG. 1). In some embodiments, operation 608 provides a copy of one of the reusable code functions as the requested software code function. In other embodiments, operation 608 modifies the reusable code function to comply with one or more features and/or specifications identified by the client device to convert the reusable code function to the requested software code function.

Operation 610 includes creating a unit-test associated with the requested software code function. The unit-test can include information related to a test execution of the requested software code function. The unit-test can indicate an execution behavior of the requested software code function including, for example, outputs, errors, performance metrics, and the like.

Operation 612 includes transmitting at least the requested software code function to the client device. In some embodiments, operation 612 further includes transmitting the unit-test to the client device. In some embodiments, operation 612 includes transmitting a status message indicating whether creation of the requested code function is successful and/or a data structure indicating which of the plurality of software policies the requested code function is compliant to.

FIG. 7 illustrates a flowchart of an example method 700 for downloading, deploying, metering, and billing usage of software function generator code, in accordance with some embodiments of the present disclosure. The method 700 can be implemented by one or more components of FIG. 1 (e.g., function generator 102 of FIG. 1), a computer (e.g., computer 801 of FIG. 1), one or more processors, and/or another configuration of hardware and/or software. In some embodiments, the method 700 occurs contemporaneously with any of the aforementioned methods.

Operation 702 includes downloading, from a remote data processing system and to one or more computers (e.g., function generator 102 of FIG. 1, computer 801 of FIG. 8, etc.) software function generator code (e.g., software function generator code 846 of FIG. 8). Operation 704 includes executing the software function generator code. The executing can include performing any of the methods and/or functionalities discussed herein. Operation 706 includes metering usage of the software function generator code. Usage can be metered by, for example, an amount of time the software function generator code is used, a number of servers, devices, and/or nodes deploying the software function generator code, an amount of resources consumed by implementing the software function generator code, a number of requested software code functions that are generated by the software function generator code, and the like. Operation 708 includes generating an invoice based on metering the usage.

In view of the above descriptions and the technical challenges previously identified, aspects of the present disclosure can realize numerous advantages. For example, a first advantage relates to code optimization. Aspects of the present disclosure can ensure that compatible functions are used in an application, thereby increasing performance and reducing errors in newly developed applications.

A second example advantage relates to application migration. Aspects of the present disclosure make it easier to write applications for different platforms. For example, an application written for a first platform can be readily converted to perform well on a second platform by updating the relevant machine policies, re-creating functions, and repeating the build-process. In doing so, aspects of the present disclosure save development overhead and avoid performance issues arising from traditional application migration strategies.

A third example advantage relates to compliance and auditing. By utilizing aspects of the present disclosure, it becomes easier to write applications that are compliant with one or multiple policies. For example, an organization can encode a prohibition of Cipher Block Chaining (CBC) algorithms in a policy, thereby ensuring no CBC algorithms are used in application development. Similarly, the function generator 102 can be configured to modify functions to add auditing trails, thereby making development easier, troubleshooting faster, and a newly developed application more robust.

A fourth example advantage relates to logging and monitoring. Aspects of the present disclosure can be configured to generate functions enabling the logging of predetermined metrics. Moreover, the created functions can have embedded metric streaming tools (e.g., OpenTelemetry®), thereby reducing development overhead and enabling application tracing when needed.

A fifth example advantage relates to X-as-a-Service (XaaS), where any subscription-based application can be made to run on any platform. In this example, aspects of the present disclosure can ensure the application is always operating under the right policies, thereby ensuring performance, compliance, and enabling accurate auditing.

A sixth example advantage relates to unit testing. As previously discussed, aspects of the present disclosure can generate unit-tests for the generated functions, thereby enabling a straightforward determination of whether or not the generated function works as expected when reviewed by the client. As shown above, aspects of the present disclosure overcome the previously identified challenges and realize the above discussed advantages, collectively realizing a policy-compliant automated software code function generator.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 8 illustrates a block diagram of an example computing environment, in accordance with some embodiments of the present disclosure. Computing environment 800 contains an example of an environment for the execution of at least some of the computer code involved in performing the inventive methods, such as software function generator code 846. In addition to software function generator code 846, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and software function generator code 846, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in software function generator code 846 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in software function generator code 846 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

Some example embodiments will now be described. Clause 1 is a computer-implemented method. The computer-implemented method includes generating a list of algorithms configurable with a requested software code function provided by a client device, where the list of algorithms is based on evaluating a plurality of software policies; generating the requested code function based on a selected algorithm of the list of algorithms and using a repository of reusable code samples in a plurality of programming languages; and transmitting the requested code function to the client device.

Clause 2 includes the features of clause 1. In this example, the computer-implemented method further comprises creating a unit-test associated with the requested code function, wherein the unit-test indicates a performance of the requested code function.

Clause 3 includes the features of clause 2. In this example, transmitting the requested code function to the client device comprises transmitting the requested code function, the unit-test, a status message indicating whether creation of the requested code function is successful, and a data structure indicating compliant software policies of the plurality of software policies.

Clause 4 includes features of any of the preceding clauses. In this example, the plurality of software policies are respectively associated with a precedence.

Clause 5 includes the features of clause 4. In this example, a policy resolver is implemented to generate the list of algorithms and based on evaluating respective precedencies of the plurality of software policies.

Clause 6 includes the features of any of the preceding clauses. In this example, the plurality of software policies comprises an organization policy, a developer policy, an environment administrator policy, a machine policy, and a client policy.

Clause 7 includes the features of any of the preceding clauses. In this example, the repository of reusable code samples in the plurality of programming languages is generated using an Artificial Intelligence (AI) model. Further, in this example, the AI model creates the requested code function that is compliant with the plurality of software policies using the repository of the reusable code samples.

Clause 8 includes the features of any of the preceding clauses. In this example, the plurality of software policies comprises a machine policy, and wherein the machine policy is generated by implementing performance benchmarks against an associated computational environment with compatible software functions exhibiting relatively higher performance than incompatible software functions in the machine policy.

Clause 9 includes the features of any of the preceding clauses. In this example, the computer-implemented method is executed by a computational system based on software function generator code downloaded to the computational system from a remote data processing system, and wherein the computer-implemented method further comprises: metering usage of the software function generator code; and generating an invoice based on metering the usage of the software function generator code.

Clause 10 is a system comprising one or more processors and one or more computer-readable storage media storing program instructions which, when executed by the one or more processors, are configured to cause the one or more processors to perform a method according to any one of clause 1 to clause 9.

Clause 11 is a computer program product comprising one or more computer readable storage media, and program instructions collectively stored on the one or more computer readable storage media, the program instructions comprising instructions configured to cause one or more processors to perform a method according to any one of clause 1 to clause 9.

What is claimed is:

1. A computer-implemented method comprising:

generating a list of algorithms configurable with a requested code function provided by a client device, wherein the list of algorithms is based on evaluating a plurality of software policies, wherein the plurality of software policies includes a changed machine policy, and wherein the requested code function supports migration of the requested code function from a first platform to a second platform;

generating the requested code function based on a selected algorithm of the list of algorithms and using a repository of reusable code samples in a plurality of programming languages;

creating a unit-test associated with the requested code function, wherein the unit-test indicates a performance of the requested code function; and transmitting the requested code function to the client device, wherein transmitting the requested code function to the client device comprises transmitting the requested code function, the unit-test, a status message indicating whether creation of the requested code function is successful, and a data structure indicating compliant software policies of the plurality of software policies.

2. The computer-implemented method of claim 1, wherein the plurality of software policies are respectively associated with a precedence.

3. The computer-implemented method of claim 2, wherein a policy resolver is implemented to generate the list of algorithms and based on evaluating respective precedencies of the plurality of software policies.

4. The computer-implemented method of claim 2, wherein the plurality of software policies respectively associated with the precedence is a ranked list from a higher precedence to a lower precedence comprising: (i) organization policies, (ii) environment administrator policies, (iii) developer policies, (iv) machine policies, and (v) customer policies.

5. The computer-implemented method of claim 1, wherein the plurality of software policies comprises an organization policy, a developer policy, an environment administrator policy, the changed machine policy, and a client policy.

6. The computer-implemented method of claim 1, wherein the repository of reusable code samples in the plurality of programming languages is generated using an Artificial Intelligence (AI) model, and wherein the AI model creates the requested code function that is compliant with the plurality of software policies using the repository of the reusable code samples.

7. The computer-implemented method of claim 1, wherein the changed machine policy is generated by implementing performance benchmarks against an associated computational environment with compatible software functions exhibiting relatively higher performance than incompatible software functions in the changed machine policy.

8. The computer-implemented method of claim 1, wherein the computer-implemented method is executed by a computational system based on software function generator code downloaded to the computational system from a remote data processing system, and wherein the computer-implemented method further comprises:

metering usage of the software function generator code; and generating an invoice based on metering the usage of the software function generator code.

9. The computer-implemented method of claim 1, wherein the requested code function is an application.

10. The computer-implemented method of claim 1, wherein the requested code function is an executable.

11. The computer-implemented method of claim 1, wherein the requested code function is a library.

12. The computer-implemented method of claim 1, wherein the requested code function is a container image.

13. The computer-implemented method of claim 1, wherein the requested code function is a Kernel-based Virtual Machine (KVM) guest.

14. A system comprising:

one or more processors; and one or more computer-readable storage media storing program instructions which, when executed by the one or more processors, are configured to cause the one or more processors to perform a method comprising:

generating a list of algorithms configurable with a requested code function provided by a client device, wherein the list of algorithms is based on evaluating a plurality of software policies, wherein the plurality of software policies includes a changed machine policy, and wherein the requested code function supports migration of the requested code function from a first platform to a second platform;

generating the requested code function based on a selected algorithm of the list of algorithms and using a repository of reusable code samples in a plurality of programming languages;

creating a unit-test associated with the requested code function, wherein the unit-test indicates a performance of the requested code function; and transmitting the requested code function to the client device, wherein transmitting the requested code function to the client device comprises transmitting the requested code function, the unit-test, a status message indicating whether creation of the requested code function is successful, and a data structure indicating compliant software policies of the plurality of software policies.

15. The system of claim 14, wherein the plurality of software policies are respectively associated with a precedence, and wherein a policy resolver is implemented to generate the list of algorithms and based on evaluating respective precedencies of the plurality of software policies.

16. The system of claim 14, wherein the plurality of software policies comprises an organization policy, a developer policy, an environment administrator policy, the changed machine policy, and a client policy.

17. The system of claim 14, wherein the changed machine policy is generated by implementing performance benchmarks against an associated computational environment with compatible software functions exhibiting relatively higher performance than incompatible software functions in the changed machine policy.

18. A computer program product comprising one or more computer readable storage media, and program instructions collectively stored on the one or more computer readable storage media, the program instructions comprising instructions configured to cause one or more processors to perform a method comprising:

generating a list of algorithms configurable with a requested code function provided by a client device, wherein the list of algorithms is based on evaluating a plurality of software policies, wherein the plurality of software policies includes a changed machine policy, and wherein the requested code function supports migration of the requested code function from a first platform to a second platform;

generating the requested code function based on a selected algorithm of the list of algorithms and using a repository of reusable code samples in a plurality of programming languages;

creating a unit-test associated with the requested code function, wherein the unit-test indicates a performance of the requested code function; and transmitting the requested code function to the client device, wherein transmitting the requested code function to the client device comprises transmitting the requested code function, the unit-test, a status message indicating whether creation of the requested code function is successful, and a data structure indicating compliant software policies of the plurality of software policies.

19. The computer program product of claim 18, wherein the plurality of software policies are respectively associated with a precedence, and wherein a policy resolver is implemented to generate the list of algorithms and based on evaluating respective precedencies of the plurality of software policies.

20. The computer program product of claim 18, wherein the plurality of software policies comprises an organization policy, a developer policy, an environment administrator policy, the changed machine policy, and a client policy; and wherein the changed machine policy is generated by implementing performance benchmarks against an associated computational environment with compatible software functions exhibiting relatively higher performance than incompatible software functions in the changed machine policy.

* * * * *